(12) United States Patent
Tung et al.

(10) Patent No.: US 6,528,969 B2
(45) Date of Patent: Mar. 4, 2003

(54) CHARGING DEVICE OF MOBILE PHONE SUITABLE FOR MOBILE PHONES OF VARIOUS TYPES

(76) Inventors: Hsin Chih Tung, 11F-1, No. 959, Yung Fu Rd., Chung Li City, Tao Yuan Hsien (TW); Hong Wei Yang, 11F-1, No. 959, Yung Fu Rd., Chung Li City, Tao Yuan Hsien (TW)

( * ) Notice: Subject to any disclaimer, the term of this patent is extended or adjusted under 35 U.S.C. 154(b) by 0 days.

(21) Appl. No.: 09/907,576

(22) Filed: Jul. 19, 2001

(65) Prior Publication Data

US 2003/0015991 A1 Jan. 23, 2003

(51) Int. Cl.[7] .................................................. H02J 7/00
(52) U.S. Cl. ........................................................ 320/103
(58) Field of Search ................................. 320/103, 114

(56) References Cited

U.S. PATENT DOCUMENTS 5,621,299 A * 4/1997 Krall ........................... 307/66
5,686,809 A * 11/1997 Kimura et al. ............... 320/101
6,043,626 A * 3/2000 Snyder et al. ............... 320/107
6,184,654 B1 * 2/2001 Bachner et al. ............. 320/114

* cited by examiner

*Primary Examiner*—Gregory J. Toatley, Jr.
(74) *Attorney, Agent, or Firm*—Rosenberg, Klein & Lee

(57) ABSTRACT

A mobile phone may be recharged from a set of batteries contained in a battery box. A power transforming box mechanically and electrically connected to the battery box is used to transform a voltage of the batteries in the battery box into the applicable voltage of a mobile phone. The power transforming box is equipped with a voltage switch for selecting the applicable charging voltage from the charger. The power input of the mobile phone is connected to the output of the charger through a connecting wire. The charging device is suitable for mobile phones of various types and can be used conveniently. Furthermore, the charger has a function of displaying an incoming phone number and may be equipped with a vibrator, flashers or sound transducers to alert the user of the incoming call.

7 Claims, 6 Drawing Sheets

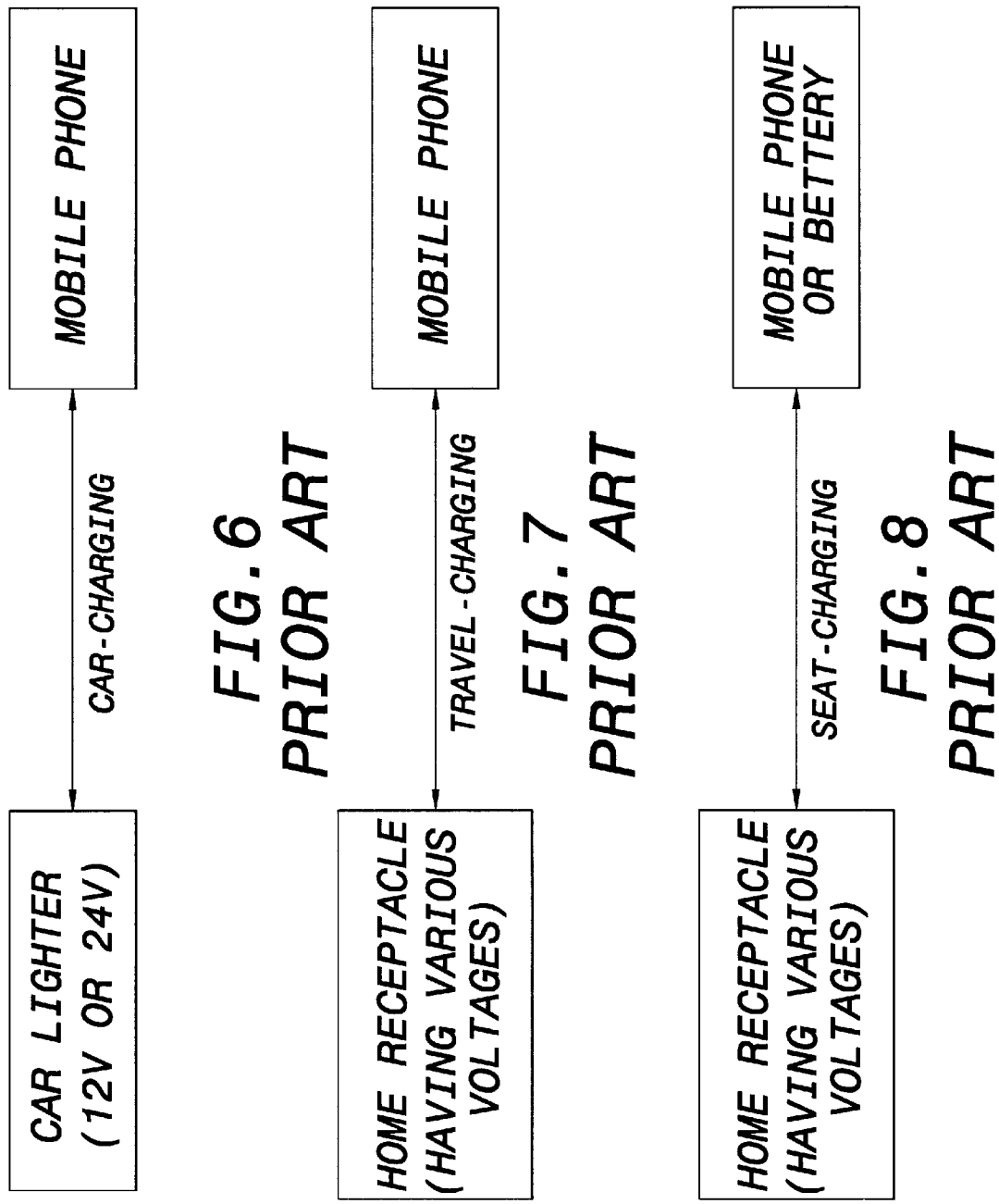

CHARGING DEVICE OF MOBILE PHONE SUITABLE FOR MOBILE PHONES OF VARIOUS TYPES

FIELD OF THE INVENTION

The present invention relates to a portable charging device of a mobile phone suitable for mobile phones of various types for charging when no other charging source is available.

BACKGROUND OF THE INVENTION

Currently, the prior art chargers charge a mobile phone through a car power source, a home power source and an office power source as shown in FIGS. 6, 7, and 8. The chargers supply power through an AC power source or a car cigar-lighter (12V 24V). The utilization is restrictive. Namely, when away from the power supplies from the car power source, home power source or office power source, the mobile phone user may not recharge his battery.

To cause a mobile phone to be available even when the power of a battery is exhausted, in general, standby batteries are carried by users. However, it is possible that a user can not find batteries for his phone while business traveling, so that many business opportunities may be lost.

Furthermore, the charging types and specifications (voltages and pins) of current mobile phones are not identical so that the chargers are different for different types of mobile phones. As a result, inventory costs increase.

SUMMARY OF THE INVENTION

Accordingly, the primary object of the present invention is to provide a charging device of a mobile phone suitable for mobile phones of various types, wherein generally used dry batteries and a special circuit are utilized so that the charging device can be used in mobile phones of various types.

Another object of the present invention is to provide a charging device of a mobile phone suitable for mobile phones of various types, wherein the circuit has the function of displaying an incoming phone number and can vibrate for informing the user of an incoming phone call.

The various objects and advantages of the present invention will be more readily understood from the following detailed description when read in conjunction with the appended Drawing.

BRIEF DESCRIPTION OF THE DRAWINGS

FIG. 6 is a schematic view showing the prior charging way by a car device.

FIG. 7 is a schematic view showing the prior charging way in traveling.

FIG. 8 is a schematic view showing the prior charging way by a charging seat.

DETAILED DESCRIPTION OF THE PREFERRED EMBODIMENTS

In order that those skilled in the art can further understand the present invention, a detailed description will now be presented. However, these descriptions and the appended drawings are only to be used to assist those skilled in the art to understand the objects, features, and characteristics of the present invention, but not to be used to confine the scope and spirit of the present invention defined in the appended claims.

Figure 1:
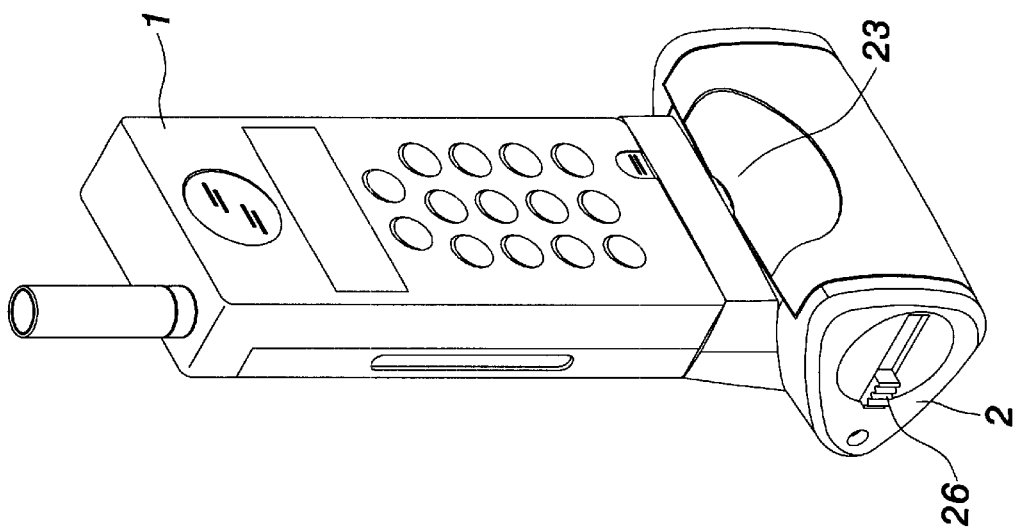
FIG. 1 is a perspective view of the present invention.
Figure 2:
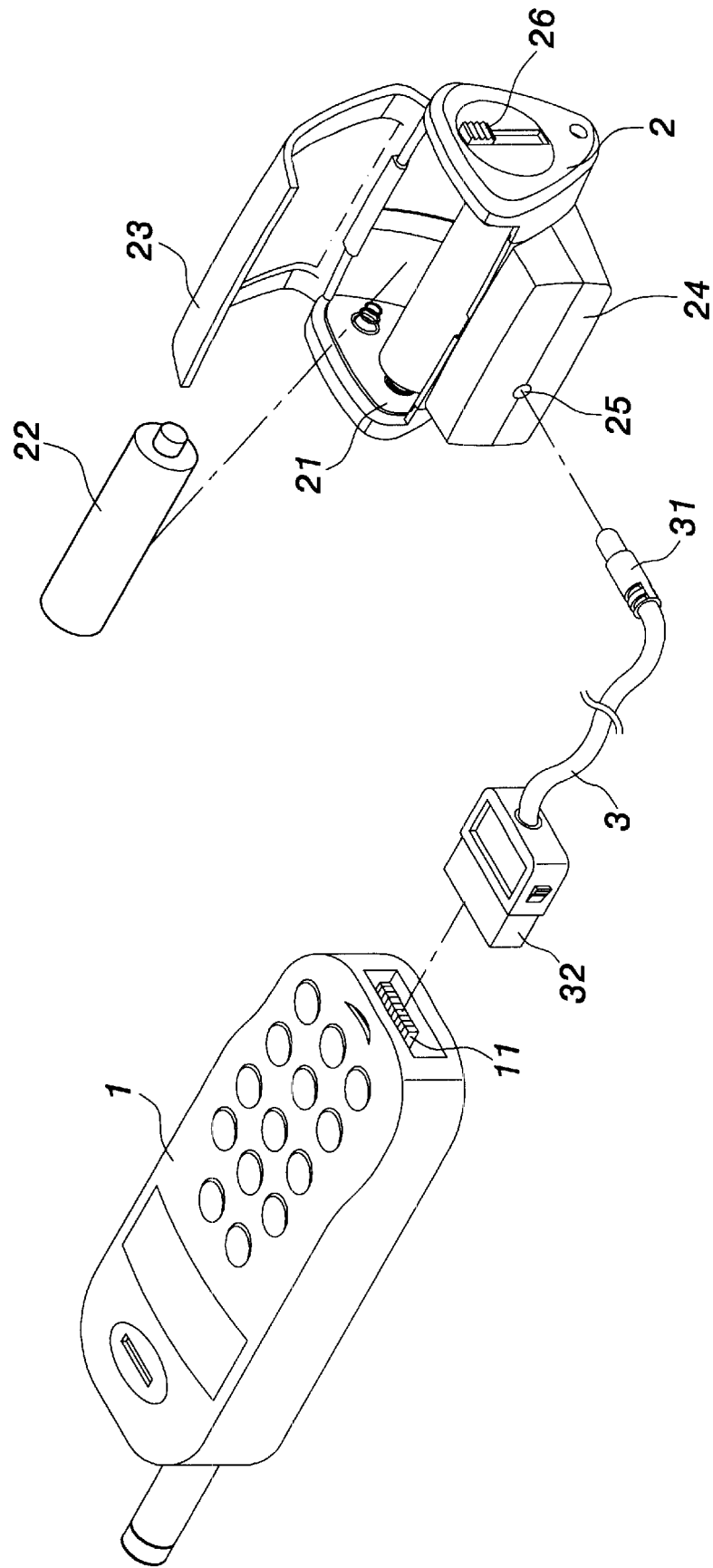
FIG. 2 is an exploded view of the present invention.

Referring to FIGS. 1 and 2, the charging device of a mobile phone of the present invention is illustrated. The charging device includes a mobile phone 1, a charger 2, a connecting wire 3. The charger 2 is installed with a battery box 21 for receiving a plurality of batteries 22 (AA or AAA size). The battery box 21 is pivotally installed with a battery cover 23. As the battery cover 23 is opened, then batteries 22 can be taken out or placed into the box. The side adjacent to the battery cover 23 is installed with a power transforming box 24 which is mechanically and electrically connected to the battery box 21 for transforming the voltage of the battery in the battery box 21 into a voltage of the mobile phone 1. The power transforming box 24 is installed with a power output receptacle 25. The power transforming box 24 is installed with a voltage switch 26. By switching the voltage switch 26, the charging voltage of the charger 2 can be changed.

One end of the connecting wire 3 has a DC connector 31 for being inserted into the power output receptacle 25 of the charger 2. Another end of the charger 2 is installed with an adapter 32 for being engaged to the power receptacle 11 of the mobile phone 1. By this adapter 32, the power output arrangement can be adapted to suit the power pins of various mobile phones.

Further, to match the voltage requirements of various mobile phones, the power transforming box 24 may be modified to produce the applicable voltage.

In operation, the voltage switch 26 can be switched to a position matching to the voltage of the mobile phone 1 being charged. The DC connector 31 and the adapter 32 of the connecting wire 3 are connected to the power output receptacle 25 of the power transforming box 24 and the power receptacle 11 of the mobile phone 1. A proper battery is placed into the battery box 21 of the charger 2. Then the charging operation can be performed.

Figure 3:
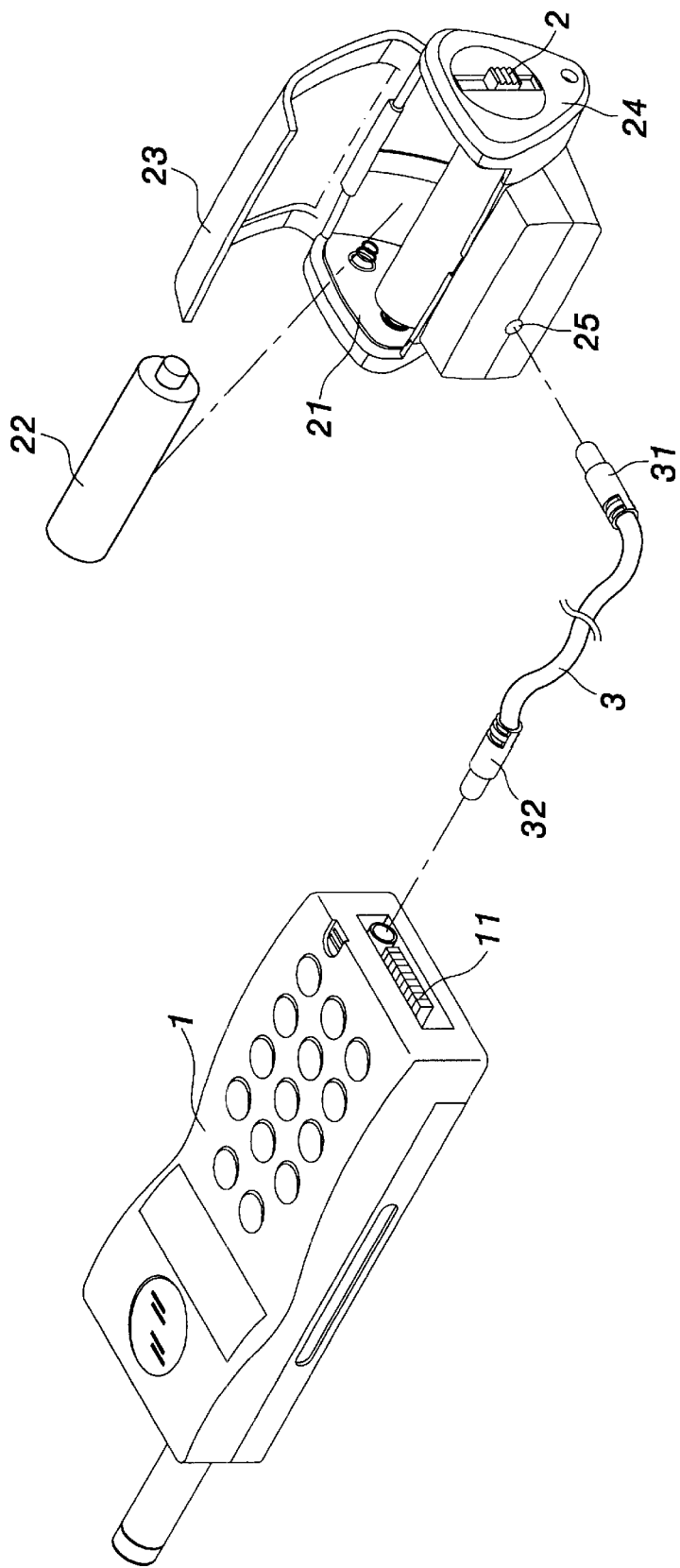
FIG. 3 shows another embodiment of the present invention.
Figure 4:
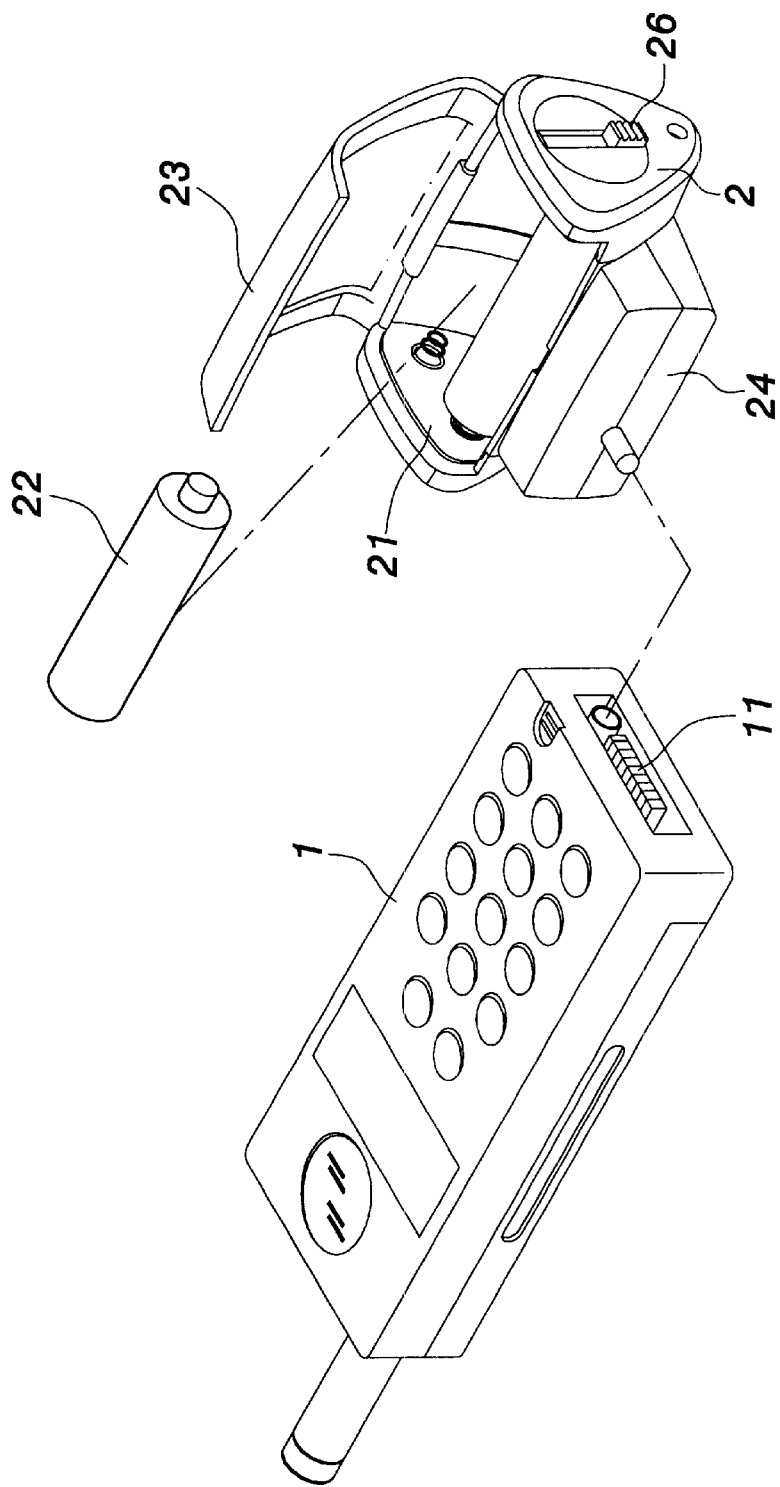
FIG. 4 shows a further embodiment of the present invention.

With reference to FIG. 3, the adapter 32 of the connecting wire 3 is designed with the power receptacle 11 for the mobile phone 1. The difference between FIG. 3 and FIG. 2 is that the adapter 32 of the connecting wire 3 has a round shape instead of a rectangular shape for matching to the receptacle of a mobile phone 1 having a round inserting hole.

Figure 5:
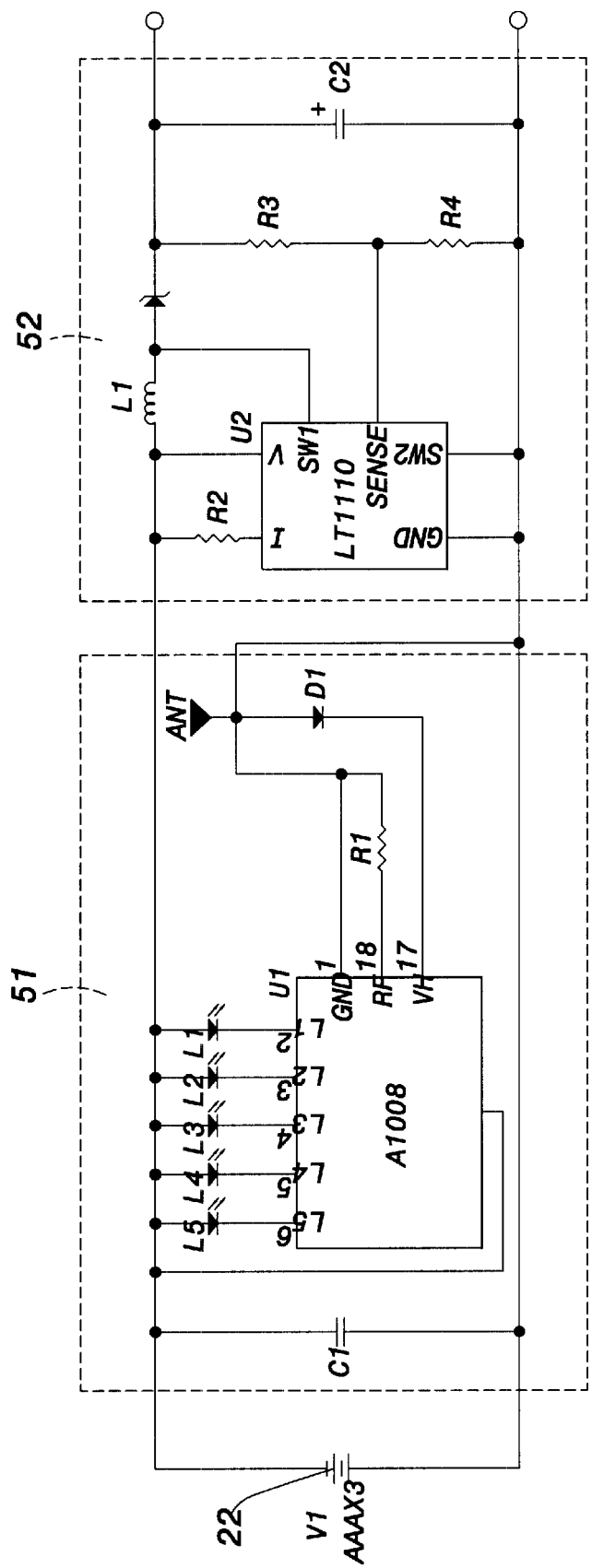
FIG. 5 shows a circuit in the present invention.

Further, in the present invention, an antenna ANT (or coil) is contained in the charger 2, as shown in FIG. 5 for generating vibrations, emitting light or sound. Also, the charger has the function of displaying an incoming phone number.

Referring to FIG. 5, in the circuit of the present invention, a circuit 51 for displaying incoming phone number is formed, which is formed by an IC U1, light emitting diodes L1~L5, a resistor R1, a diode D1, and an antenna ANT. The circuit 51 derives a working power from the battery box 22. The battery box 22 is connected to a voltage transforming circuit 52 formed by an IC U2, an inductor L1, resistors R2, R3, and R4, and a capacitor C2. The voltage transforming circuit 52 is used to boost the voltage of the battery 22 for acquiring the input power of various types of mobile phones. The power can be selected through the voltage switch 26.

The features of the present invention are:

1. The present invention is suitable for mobile phones of various types, and therefore, the products can be used conveniently.

2. The problem of having an uncharged mobile phone is relieved, as a mobile phone can be charged by the present invention where conventional charging sources are unavailable.

3. The charger has a function of displaying incoming phone number.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charging device of a mobile phone suitable for mobile phones of various types comprising:

a battery box for retaining a plurality of batteries;

a power transforming box mechanically and electrically connected to said battery box for transforming a voltage of said plurality of batteries in said battery box into a voltage of the mobile phone; and a voltage switch installed on said power transforming box for selecting an output charging voltage from the charging device.

2. A charging device of a mobile phone suitable for mobile phones of various types comprising:

a battery box for placing batteries;

a power transforming box mechanically and electrically connected to said battery box for transforming a voltage of said batteries in said battery box into a voltage of a mobile phone, said power transforming box being installed with a voltage switch, wherein by said voltage switch, a charging voltage outputted from a charger can be changed; and an antenna coupled to a circuit for displaying an incoming phone number, for generating vibrations and for emitting light or sound.

3. The charging device of a mobile phone suitable for mobile phones of various types as recited in claim 1, wherein each of said plurality of batteries in said battery box is a AA or AAA size battery.

4. The charging device of a mobile phone suitable for mobile phones of various types as recited in claim 1, wherein the mobile phone is directly inserted to said power transforming box.

5. The charging device of a mobile phone suitable for mobile phones of various types as recited in claim 1, wherein a power input of the mobile phone is connected to an output of the charging device through a connecting cable.

6. The charging device of a mobile phone suitable for mobile phones of various types as recited in claim 5, wherein one end of said connecting cable is connected to an adapter of the mobile phone.

7. The charging device of a mobile phone suitable for mobile phones of various types as recited in claim 5, wherein one end of said connecting cable is installed with a DC connector coupled to the charging device.

* * * * *